Dec. 29, 1942.　　　T. A. WETZEL　　　2,306,578
CONTROL APPARATUS
Filed June 17, 1938　　　2 Sheets-Sheet 1

Inventor:
Theodore A. Wetzel
By Brown, Jackson, Boettcher & Dienner
Attys.

Inventor:
Theodore A. Wetzel
By Brown, Jackson, Boettcher & Dienner
Attys.

Patented Dec. 29, 1942

2,306,578

UNITED STATES PATENT OFFICE 2,306,578

CONTROL APPARATUS

Theodore A. Wetzel, Milwaukee, Wis., assignor to Milwaukee Gas Specialty Company, Milwaukee, Wis., a corporation of Wisconsin Application June 17, 1938, Serial No. 214,367

12 Claims. (Cl. 158—117.1)

This invention relates to improvements in control apparatus.

While certain embodiments of the invention to be hereinafter described in connection with the drawings employ transformer type core structures and show the invention as a burner control in which the main burner of a space heater or other heater is controlled by the pilot lighter, it is to be understood that the invention is not limited in these respects to the particular embodiments selected for illustration. For example, the invention may be applied to a reactor, a magnetic valve, a motorized valve, or other device the operation of which will depend on the shifting of the alternating current flux by virtue of the direct current magnetization by means of the thermocouple, and the controlled means may be any burner or other means adapted to be controlled by the device the operation of which is controlled by the shifting flux.

One of the main objects of the invention is to provide a control apparatus adapted for utilizing the thermoelectric current produced by a thermocouple for shifting the magnetic flux from one magnetic circuit to another to provide the desired control.

It is also an object of the invention to provide a control apparatus in which a current amply sufficient to operate and maintain the control device in operative position may be controlled by a relatively weak thermoelectric current in a simple, inexpensive and improved manner and, if desired, without moving parts in the control apparatus, although moving parts may be employed within the broader aspects of the invention, as will hereinafter appear.

Other advantages and adaptations of the invention will be apparent from the following detailed description, taken in connection with the accompanying drawings, in which.

Figure 1:
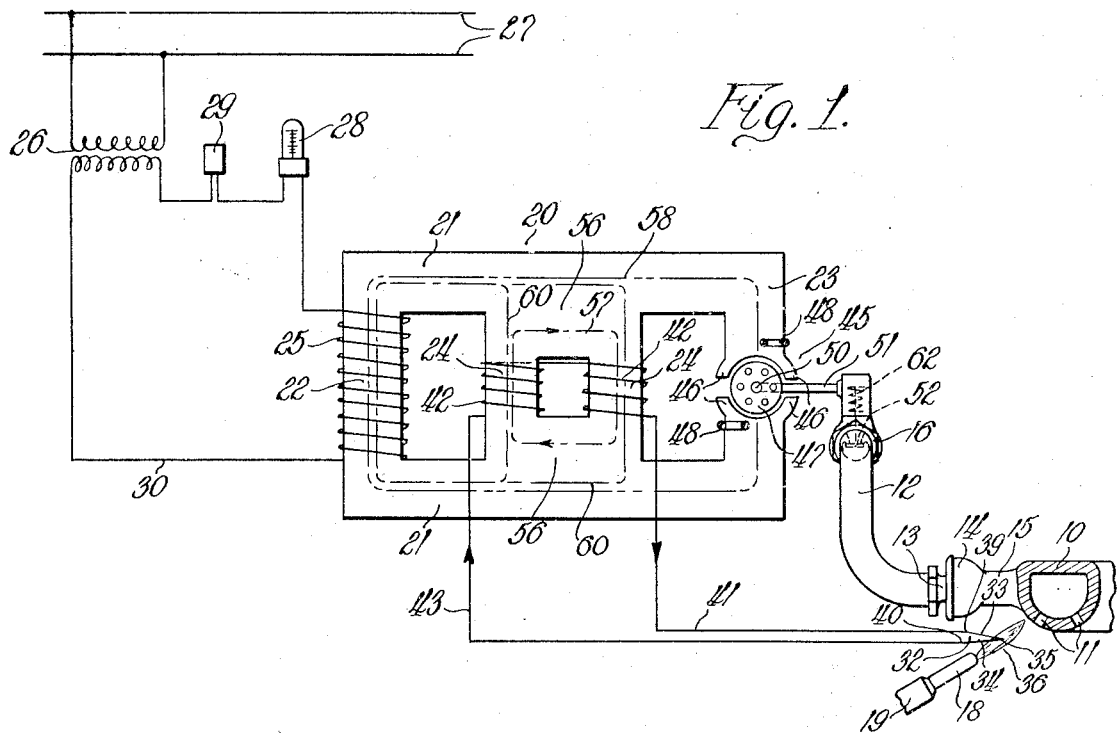
Figures 1 and 2 are more or less schematic or diagrammatic views showing two forms of control apparatus and controlled systems embodying the present invention.

With reference now to the drawings, in the particular embodiment of the invention illustrated in Figure 1, 10 designates a main burner which may be the main burner of a room or other space heater, an oven burner, or any burner or other device which it is desired to control by the control apparatus of the present invention.

The burner 10, which has burner openings indicated at 11, is supplied with gaseous or other suitable fuel from a fuel supply conduit 12 by way of a nozzle pipe 13 which delivers the gaseous fuel into the mixing chamber 14 at the outer end of the feed pipe 15. Air may be admitted to the mixing chamber 14 in the usual or any suitable or preferred manner, and the opposite end of the feed pipe 15 is connected to the burner 10 for feeding the mixture of air and gaseous fuel thereto. The heater may have an enclosing wall (not shown), and the fuel supply conduit 12 is provided with a fuel control valve indicated at 16. A pilot lighter 18 is provided in appropriate proximity to the burner 10. Fuel is supplied to the pilot lighter 18 by a tube 19 which may lead from the fuel supply conduit 12 of from any other suitable or preferred source of fuel.

The control apparatus shown in Figure 1 comprises a magnetic core 20 of laminated or other suitable form. The particular core 20 shown in this figure has opposite side legs 21, 21, end legs 22, 23, and a pair of shunt legs 24, 24 connecting the side legs 21, 21 intermediate the end legs 22 and 23.

An alternating current primary winding 25 is wound around the end leg 22 and connected, for example, by a transformer 26 or otherwise as desired to an alternating current circuit 27. The circuit 27 may be an alternating current lighting circuit or any other alternating current circuit supplied by a suitable source of alternating current (not shown). Where the apparatus is used for controlling a space heater as above described, a thermostat 28 and any other control or controls shown schematically at 29 may be connected in series in the circuit 30 which includes the alternating current primary winding 25. The thermostat 28 may be opened and closed in accordance with the temperature of the room heated by the heater, where the heater is a room heater, or the thermostat 28 may be arranged to be opened and closed in accordance with the temperature of the water in the tank associated with the burner 10, where the heater is a water heater, or otherwise as desired. The control 29 may be a limit control or any other suitable or preferred auxiliary control or combination of controls, as well known in the art.

A thermocouple 32, comprising two metallic thermocouple members 33 and 34 joined to form a thermal junction at 35, is placed with the junction 35 in the pilot lighter flame 36 or adjacent to this flame to be subject to the heat thereof. The thermocouple members 33 and 34 are formed of dissimilar metals, such as, for example, iron and "Constantin," "Chromel" and "Copel," "Chromel" and "Constantin," "Chromel" and "Alumel," or any of numerous other combinations. The other two thermal junctions 39 and 40 of the thermocouple members 33 and 34 are connected by conductors 41 and 43 to a pair of direct current windings 42 wound around the shunt legs 24, 24 of the core 20 and connected in series circuit relation in the direct current circuit 43 which includes the thermocouple 32.

The leg 23 of the core 20 has the stator 45 of an alternating current motor formed integral therewith. The stator 45 comprises pole pieces 46, with a gap therebetween for the rotor 47. For producing the desired rotation, the rotor 47 is preferably of squirrel cage or other suitable form, and the stator pole pieces are provided with shading coils or other suitable means indicated at 48. The rotor 47 of the motor is mounted between the stator poles 46 for rotation about the axis of the rotor shaft 50, and is connected at 51 to actuate the valve member 52 within the valve housing of the fuel control valve 16 to open position and to hold the valve in open position by the torque imparted to the rotor 47 when the magnetic flux path is completed through the core leg 23 and the motor as will presently appear.

In operation, and assuming that the pilot lighter 18 is lighted, the pilot flame at the thermocouple junction 35 sets up and maintains, so long as the pilot lighter is lighted, a direct and particularly a thermoelectric current through the circuit 43 and windings 42 therein. Upon this energization of the windings 42 the magnetic flux set up in the core 20 thereby threads through the shunt legs 24 and through the core portions 56 generally, as indicated diagramatically by the dot and dash line 57.

The alternating current primary winding 25, being energized, sets up magnetic flux in the core 20. This magnetic flux set up by the alternating current winding 25 is diverted from the shunt legs 24 of the core 20 so long as the pilot lighter 18 is lighted by the magnetic flux set up by the direct current energization of the windings 42. As a result, the magnetic flux set up by the alternating current winding 25 completes the long path through the core legs 21, 22 and 23 and through the rotor of the shaded pole motor, substantially as indicated diagrammatically by the dot and dash line 58. The rotor is turned in a direction to actuate the valve member 52 to open position and to hold same open by the resulting torque so long as the coil 25 is energized and the pilot lighter is lighted.

However, if the pilot lighter 18 is extinguished, the direct or thermoelectric current circuit 41, 43 becomes deenergized and the magnetic flux set up by the alternating current winding 25 ceases to be diverted by magnetic flux set up in the shunt legs 24 by the direct current windings 42. As a result, the magnetic flux set up by the alternating current winding, instead of continuing through the long path 58 including the motor 45, takes the path of least resistance, i. e., the path through the shunts 24, as indicated diagrammatically by the dot and dash lines 60 or through one of the shunt legs. However, a small flux may continue to traverse the path 23 but it will not be of sufficient magnitude to create a torque capable of holding said valve in open position. This shifting of the magnetic flux set up by the alternating current winding 25 from the motor path to the shunt path is produced by the discontinuance, or drop in direct current flux density produced in the shunt legs 24 by the thermo-electric current produced by the thermocouple upon extinguishment of the pilot lighter. As a result, the torque or turning movement imparted to the rotor 47 is materially diminished and the valve member 52 is actuated to closed position—for example, by means of a spring 62 or by other means as desired—to shut off the supply of fuel to the burner 10.

When the pilot lighter 18 is reignited, the magnetic flux set up in the shunt legs 24 by the thermo-electric current produced by the thermocouple diverts the magnetic flux set up by the alternating current winding 25 from the shunt path or shunt legs to the motor path, and the motor 45 is operated thereby to actuate the valve member 52 to open position. Opening of the valve member 52 sets up a supply of fuel to the burner 10, where it issues from the ports 11 and is ignited by the lighter flame 36.

Figure 2:
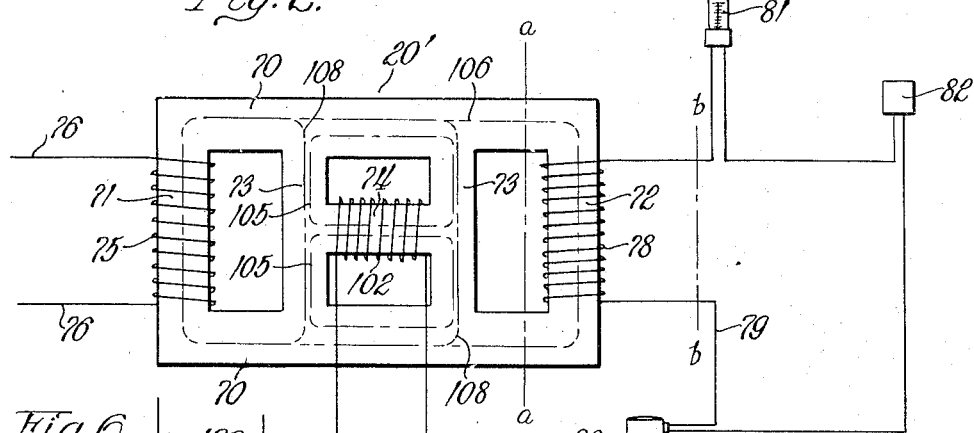

In the embodiment of the invention illustrated in Figure 2, the magnetic core 20' of the control apparatus has opposite side legs 70, 70, end legs 71, 72, legs 73, 73 connecting the side legs 70, 70 intermediate the end legs 71, 72, and a leg 74 connecting the legs 73, 73 intermediate the side legs 70, 70.

The alternating current primary winding 75 is wound around the end leg 71 and connected by input leads 76 to a suitable source of alternating current (not shown). The opposite end leg 72, instead of being interrupted to form the stator of a motor as in the preceding embodiment of the invention, is continuous and has a secondary winding 78 wound around the same. The winding 78 is connected in series circuit relation in an output circuit 79 which, in the illustrated embodiment, includes in series circuit relation the coil of an electric valve 80, a thermostat 81, and another control device 82, which latter control device may be a limit control or other control device. The control device 29 of Figure 1 may likewise, as already explained, be a limit control, for shutting off the fuel supply to the burner at predetermined temperatures.

The electric valve 80 is placed in the fuel supply conduit 83 for supplying gaseous or other suitable fuel to the burner 84 by way of a nozzle pipe 85, mixing chamber 86, and feed pipe 87 connected to the burner 84. The burner has burner openings 88. The electric valve 80 is connected into the output circuit 79 of the control apparatus, and the valve operates to open position when it is energized and thereby permits a supply of fuel to the burner 84. When the valve 80 is deenergized it closes and shuts off the fuel supply to the burner 84. Valves of this sort are well known in the art and will not be described in detail here.

A pilot lighter 90 is provided in appropriate proximity to the burner 84. Fuel is supplied to the pilot lighter 90 by a tube 91 which may lead from the fuel supply conduit 83, or from any other suitable or preferred source of fuel. The thermocouple 92, which in this case is of the type disclosed and claimed in the copending application of Oscar J. Leins, Serial No. 4,741, filed February 4, 1935, comprises an outer metallic tubular thermocouple member 93 and an inner thermocouple member 94 of dissimilar metal, as hereinbefore described, disposed within the tubular thermocouple member and joined to said tubular thermocouple member to form a thermal junction at 95. A tubular conductor 96 forming one of the thermocouple leads is connected to the outer tubular thermocouple member 93 at 97 to form a second thermal junction, and the internally disposed conductor 98 extending through the conductor 96 is connected to the inner thermocouple member 94 at 99 to form a third and enclosed thermal junction for the thermocouple.

The thermocouple 92 is placed with the junction 95 in the pilot lighter flame 100 or adjacent to this flame to be subject to the heat thereof. The thermocouple leads 96 and 98 are connected to a direct current winding 102 wound around the leg 74 of the core 20'.

In operation of the embodiment of the invention shown in Figure 2, and assuming that the pilot lighter 90 is lighted, the pilot flame at the thermocouple junction 95 sets up and maintains, so long as the pilot lighter is lighted, a direct and particularly a thermo-electric current through the circuit including the conductors 96 and 98 and the direct current winding 102. The winding 102 is thus energized and the magnetic flux set up in the core 20' thereby threads through the core legs 70, 73 and 74 generally, as indicated diagrammatically by the dot and dash lines 105. What might be termed the shunt portion of the magnetic core 20' in this embodiment of the invention is surrounded or enclosed by the main portion of the core which is thus of the "shell" type.

The alternating current primary winding 75 being energized sets up magnetic flux in the core 20'. So long as the pilot flame 90 is lighted, the greater portion of this magnetic flux set up by the alternating current winding 75 is diverted from the shunt legs 73 of the core 20, by the magnetic flux set up by the direct current energization of the single winding 102. As a result, the magnetic flux set up by the alternating current winding 75 completes the long path through the core legs 71, 70, 70, and 72 as indicated diagrammatically by the dot and dash line 106. The magnetic flux passing through the leg 72 of the core 20' produces a current in the secondary winding 78, thereby energizing the circuit 79 which includes the coil of the electric valve 80. This energization of the coil of the valve 80 opens this valve and maintains it open to set up a supply of fuel to the burner 84 so long as the pilot lighter 90 is lighted.

However, if the pilot lighter 90 is extinguished, the direct or thermo-electric current circuit 96, 98, including the winding 102, becomes deenergized, and the magnetic flux set up by the alternating current winding 75 ceases to be diverted from the shunt legs 73 by direct current flux. As a result, the alternating current flux set up by the winding 75, instead of continuing through the long path 106 including the leg 72, takes the path of least resistance, i. e., the path through the shunt legs 73 as shown by dot and dash lines 108, or through at least one of these legs 73. It is understood, however, that the small amount of flux remaining at this time in leg 72 is insufficient to maintain electric valve 80 in its open position. This shifting of the alternating current flux from the leg 72 to the shunt path is produced upon extinguishment of the pilot lighter by the accompanying discontinuance of direct current flux or drop in direct current flux density in the shunt path. As a result, the winding 78 and its circuit 79 are deenergized and the valve 80 is actuated to closed position—for example, by a spring or otherwise as desired to shut off the supply of fuel to the burner 84.

When the pilot lighter 90 is reignited, the direct current flux set up in the shunt path by the thermo-electric current diverts the alternating current flux set up by the winding 75 from the shunt path to the path 106 including the leg 72 and the output circuit 79 is energized to open the valve 80 providing circuit 79 is completed through thermostat 81 and auxiliary controls 82. Opening of the valve 80 sets up a supply of fuel to the burner 84 where it issues from the ports 88 and is ignited by the lighter flame 100.

Figure 3:
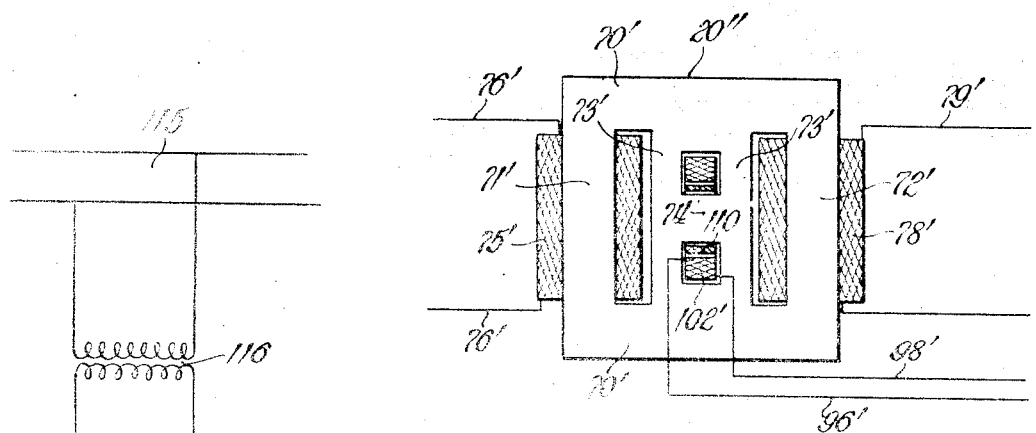
Figure 3 illustrates the magnetic structure and windings of another embodiment of the invention.

Figure 3 shows a magnetic core structure 20" similar to the core structure shown in Figure 2 and with the windings similarly arranged thereon, like parts being designated by primed reference characters corresponding with the reference characters in Figure 2. In this embodiment, however, an extra short circuited coil or ring 110 is wound on the leg 74' under the direct current winding 102'. Said coil or ring may be in the form of washers placed beside the coil 102'. This short circuited coil or ring operates to maintain a constant direct current flux when the direct current winding 102' is energized by resisting the "bucking" action of the alternating current flux when it tends to neutralize the direct current flux. This also minimizes any induced alternating current ripple in the direct current electric circuit. Another winding may be wound on the same leg as the direct current winding 102' for the purpose of canceling out any direct current magnetization in order to secure a reverse action control.

Figure 4:
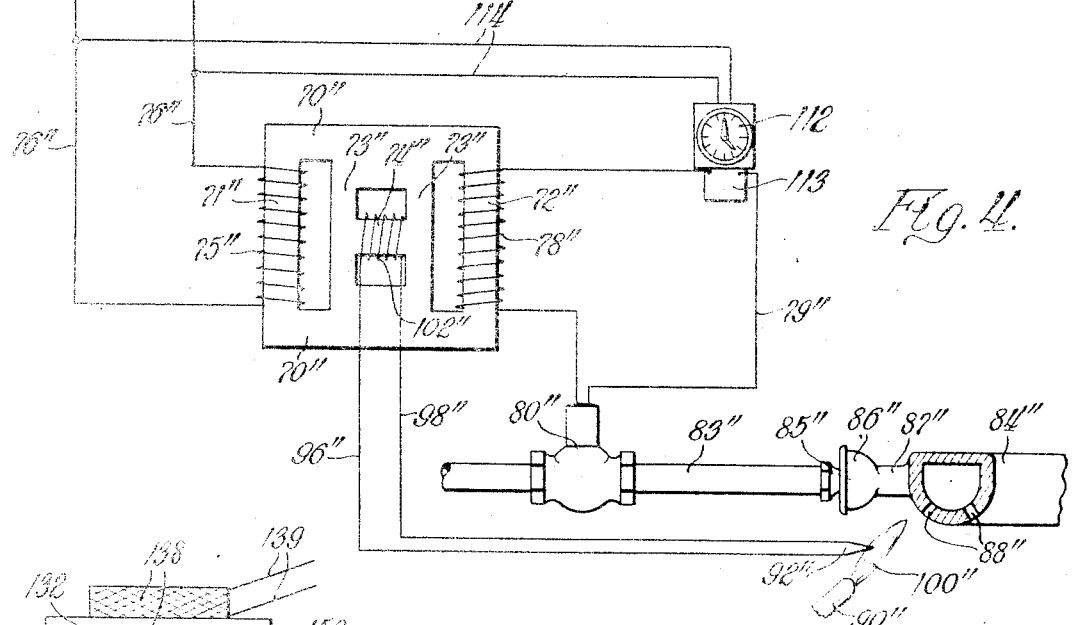
Figure 4 is a schematic or diagrammatic view showing another system embodying the invention.

The embodiment of the invention illustrated in Figure 4 is similar to the embodiment illustrated in Figure 2 except that in this case the circuit 79" of the secondary output coil 78" has a time clock 112 controlling a time switch 113 for opening and closing the circuit 79" and thereby opening and closing the valve 80" at predetermined time intervals to provide a timed control for the burner 84". The clock 112 is shown as an electric clock connected by leads 114 to the leads 76" for the alternating current primary winding 75". The leads 76" are shown as connected to the alternating current supply circuit 115 by a transformer 116, and other parts which are similar to parts shown in Figure 2 are designated by double-primed reference characters corresponding with the reference characters in Figure 2.

Figure 5:
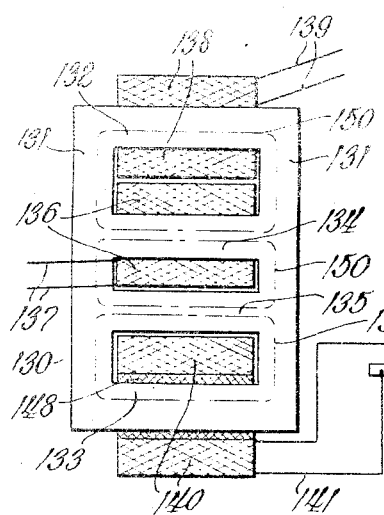
Figure 5 is a view similar to Figure 3, illustrating the magnetic structure and windings of another embodiment of the invention.

In the embodiment of the invention shown in Figure 5 the core structure 130 has side legs 131, end legs 132, 133, and two legs 134 and 135 connecting the side legs 131 between the end legs. The alternating current primary winding 136 is wound around the leg 134 and connected by input leads 137 to a suitable source of alternating current. The secondary or output winding 138 is wound around the end leg 132 and connected to the controlled or output circuit 139. The direct current winding 140 is wound around the end leg 133 and is connected by leads 141 to the thermocouple 142 as described in connection with the preceding embodiments of the invention. The thermocouple 142 is placed with the junction 144 thereof in the pilot flame 145 of the pilot lighter 146 or in appropriate proximity thereto. A short-circuited band or coil 148 is preferably wound on the leg 133 under the direct or thermoelectric current winding 140 for the purposes described in connection with the short-circuited band or winding 110 in Figure 3.

With the alternating current primary winding 136 energized by the alternating current circuit, alternating current flux is set up generally as indicated by the lines 150, the magnetic lines of force passing through the end leg 132 at this time producing a current in the secondary coil 138, but this current is insufficient to operate the desired devices or produce the desired control. However, when the pilot flame 145 is burning the thermoelectric current set up thereby in the coil 140 produces direct current flux generally as indicated by the dot and dash line 152. This direct current flux diverts the alternating current flux from the leg 135 through the end leg 132 along the upper dot and dash line 150 and, as a result, the current in the secondary coil 138 is increased sufficiently to provide the desired control or operation of the devices in the circuit 139.

The embodiment of the invention shown in Figure 5 produces the controlling operation by a current differential, but the structure may be modified to produce either a secondary output current or no secondary output current, depending upon the path of the flux as controlled by the direct or thermoelectric current. For example, by making the lower flux path 150 sufficiently shorter than the upper flux path 150 the entire or substantially the entire alternating current flux may follow only the lower path 150 when the direct current coil 140 is deenergized. Then, upon energization of the coil 140, the direct current flux produced thereby will shift the alternating current flux from the lower flux path 150 to the upper flux path 150 to provide the desired operation or control.

The structure shown in Figure 5 permits of a shorter flux path for the working alternating current flux and also permits a suitable form for the direct current coil in that it allows a long winding axially and thus provides a minimum length of mean turns to secure maximum ampere turns.

The magnetic path to the right of the line a—a in Figure 2, as well as the corresponding magnetic paths in the other figures, may consist of a relay, solenoid, motor, or any other device the operation of which will depend on the shifting of the alternating current flux by virtue of the direct current magnetization by means of the thermocouple as herein described.

Figure 6:
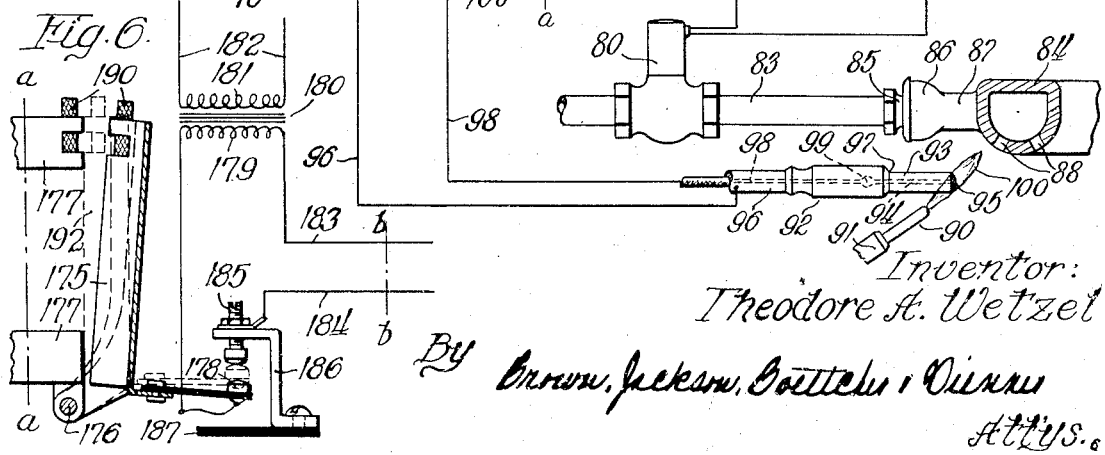
Figure 6 is a fragmentary and more or less diagrammatic view showing another embodiment of the invention.

In Figure 6 for example, the magnetic path to the right of the line a—a is in the form of a relay having an armature 175 pivoted at 176. The magnetic structure 177 and coil arrangement to the left of the line a—a may correspond with the magnetic structure and coil arrangement to the left of the line a—a in Figure 2 or with the corresponding portion of the magnetic structure and coil arrangement of the other figures, or may be of other desired form.

The armature 175 carries a contact 178 connected to one side of a secondary winding 179 of a transformer 180. The primary winding 181 of the transformer 180 is connected by leads 182 to a suitable alternating current supply circuit or source of alternating current supply. The opposite side of the winding 179 is connected by a lead 183 to one side of the output circuit, while the other side of the output circuit is connected by a lead 184 to a contact 185, for example through a bracket 186 secured upon a suitable insulating support 187. The contact 185 is in the form of a contact screw having threaded engagement in the bracket 186 for adjustment toward and away from the contact 178. The output circuit to the right of the line b—b may be as shown to the right of the line b—b in Figure 2, or it may be of any other character desired.

The upper end of the armature 175 and the cooperating portion of the magnetic structure 177 are preferably provided with shading coils 190 for the purpose of providing a continuous pull when the armature is attracted to position against the magnetic structure 177 as shown in dotted lines at 192. These coils or other suitable shading means prevent chattering of the armature in its movement to the dotted line position 192.

In operation of the embodiment of the invention shown in Figure 6, the thermo-electric current set up when the pilot lighter is lighted as shown in the other figures shifts the alternating current magnetic flux through the illustrated portion of the magnetic structure 177 and armature 178 is attracted to its dotted line position 192, in which position the contact 178 carried by the armature is engaged with the contact 185 and closes the output circuit 183, 184. This circuit is thereupon fed with alternating current from the source of alternating current supply through the transformer 180. The current set up in the output circuit 183, 184 is thus not confined to that produced by the alternating current magnetic flux but may be any desired independent current, the circuit 183, 184 being merely controlled by the action of the relay which in turn is controlled by the alternating current magnetic flux, and this alternating current magnetic flux in turn is controlled by the thermo-electric means. The output circuit 183, 184 may of course be a direct current circuit under the control of the relay controlled by the alternating current magnetic flux, which in turn is controlled by the thermo-electric means.

When the pilot lighter is extinguished or the thermo-electric circuit otherwise becomes deenergized, the alternating current magnetic flux in the illustrated portion of the magnetic structure diminishes sufficiently so that the armature 175 ceases to be held in the dotted line position and swings by gravity to its full line position, opening the output circuit at the contacts 178, 185. If desired, spring means may be employed in addition to or in lieu of the off-center pivoting of the armature 175 and carrier for contact 178 for separating the contact 178 from the contact 185 when the alternating current magnetic flux in the illustrated portion of the magnetic structure is diminished or discontinued.

I do not intend to be limited to the precise details shown or described.

I claim:

1. In combination, a burner, a pilot lighter therefor, a control valve for said burner, a magnetic structure having a first leg for an alternating current winding and a second leg, means on said second leg and controlled by the magnetic lines of force therein for controlling said valve, a shunt path between said first and second legs through which the alternating current flux normally is adapted to pass, a thermocouple in proximity to said pilot lighter, and a direct current winding connected to said thermocouple and operative upon energization of said thermocouple to produce a direct current flux in said magnetic structure for diverting the alternating current flux from said shunt path to said second leg.

2. In combination, a magnetic structure having a first leg for an alternating current primary winding and a second leg, an alternating current primary winding on said first leg, a secondary winding on said second leg, an output circuit connected to said secondary winding, a burner, a pilot lighter therefor, a control valve for said burner, means in said secondary output circuit for controlling said valve, an auxiliary control switch in said circuit, a shunt path between the first and second legs of said magnetic structure through which the alternating current flux normally is adapted to pass, a thermocouple in proximity to the pilot lighter, and a direct current winding connected to said thermocouple and operative upon energization of said thermocouple to produce a direct current flux in said magnetic structure for diverting the alternating current flux from said shunt path to said second leg to energize said secondary winding and said output circuit.

3. In combination, a burner, a pilot lighter therefor, a control valve for said burner, a magnetic structure having a first leg for an alternating current winding and a second leg, means on said second leg and controlled by the magnetic lines of force therein for controlling said valve, said magnetic structure comprising a shunt path through which the alternating current flux normally is adapted to pass and to be thereby diverted from said second leg, a thermocouple in proximity to said pilot lighter, and a direct current winding connected to said thermocouple and operative upon energization of said thermocouple to produce a direct current flux in said shunt path effective for diverting the alternating current flux from said shunt path to said second leg.

4. In combination, a burner, ignition means therefor, a control valve for said burner yieldingly urged closed, a magnetic structure having a first leg for an alternating current winding and a second leg, said magnetic structure comprising a shunt path through which the alternating current flux normally is adapted to pass and to be thereby diverted from said second leg, a thermocouple heated by said ignition means, a direct current winding connected to said thermocouple and operative upon energization from said thermocouple to produce a direct current flux in said shunt path effective for diverting the alternating current flux from said shunt path to said second leg, a unidirectional motor connected to said valve for opening it when said motor is effectively energized, and supplementary means for effectively energizing said motor responsive to energization of said direct current winding and for deenergizing said motor effective to permit closing of said valve responsive to deenergization of said direct current winding.

5. In combination, a burner, a pilot lighter for said burner, control means for said burner, a magnetic structure having a first flux path for an alternating current winding and a second flux path, means in said second flux path and controlled by the magnetic lines of force therein for controlling said control means, said magnetic structure comprising a shunt path through which the alternating current flux normally is adapted to pass and thereby to be diverted from said second flux path, a thermocouple subject to heat of said pilot light, and a direct current winding connected in circuit with said thermocouple and operative upon energization of the thermocouple to produce a direct current flux in said shunt path for diverting the alternating current flux from said shunt path to said second flux path.

6. In combination, a burner, a fuel supply pipe leading to said burner, ignition means for said burner, control means for said burner yieldingly urged to position to shut off the flow of fuel to said burner, a magnetic structure having a first flux path for an alternating current winding and a second flux path, said magnetic structure comprising a shunt path through which the alternating current flux normally is adapted to pass and thereby to be diverted from said second flux path, a thermocouple in position to be heated by said ignition means, a direct current winding connected in circuit with said thermocouple and operative upon energization of said thermocouple to produce a direct current flux in said shunt path effective to divert the alternating current flux from said shunt path to said second flux path, a motor connected to said control means for operating said control means to position to set up and maintain a flow of fuel to said burner when said motor is energized and means for energizing said motor responsive to energization of said direct current winding and for deenergizing said motor to permit operation of said control means to position to shut off the supply of fuel to said burner responsive to deenergization of said direct current winding.

7. In combination, a burner, a pilot lighter therefor, an electroresponsive control valve for said burner, a magnetic structure having a first leg for an alternating current winding and a second leg, a winding on said second leg and connected in circuit with said electroresponsive valve for energizing said valve by magnetic lines of force in said second leg, said magnetic structure comprising a shunt path through which the alternating current flux is adapted to pass and to be thereby diverted from said second leg, a thermocouple in proximity to said pilot lighter, and a direct current winding connected to said thermocouple and operative upon energization of said thermocouple to produce a direct current flux in said shunt path effective for diverting the alternating current flux from said shunt path to said second leg.

8. In combination, a burner, a pilot lighter therefor, an electroresponsive control valve for said burner, a magnetic structure having a first leg for an alternating current winding and a second leg, a winding on said second leg and connected in circuit with said electroresponsive valve for energizing said valve by magnetic lines of force in said second leg, said magnetic structure comprising a shunt path through which the alternating current flux is adapted to pass and to be thereby diverted from said second leg, a thermocouple in proximity to said pilot lighter, a direct current winding connected to said thermocouple and operative upon energization of said thermocouple to produce a direct current flux in said shunt path effective for diverting the alternating current flux from said shunt path to said second leg, and means in circuit with the winding on said second leg for providing an additional control for said valve.

9. In combination, a burner, a pilot lighter therefor, an electroresponsive control valve for said burner, a magnetic structure having a first leg for an alternating current winding and a second leg, a winding on said second leg and connected in circuit with said electroresponsive valve for energizing said valve by magnetic lines of force in said second leg, said magnetic structure comprising a shunt path through which the alternating current flux is adapted to pass and to be thereby diverted from said second leg, a thermocouple in proximity to said pilot lighter, a direct current winding connected to said thermocouple and operative upon energization of said thermocouple to produce a direct current flux in said shunt path effective for diverting the alternating current flux from said shunt path to said second leg, and time controlled switch means connected in circuit with the winding on said second leg to provide a time control for said valve.

10. In combination, a burner, control means for said burner, a magnetic structure having a first portion for a first winding and a second portion, means on said second portion and controlled by the magnetic lines of force therein for controlling the control means for said burner, said magnetic structure comprising a shunt portion through which the flux set up by said first winding is adapted to pass and to be thereby diverted from the second portion of said magnetic structure, a thermocouple adapted to be subjected to the heat of a flame, and a second winding connected in circuit with said thermocouple and operative upon energization of the thermocouple to produce in the shunt portion of said magnetic structure a flux for diverting the first-mentioned flux from the shunt portion of said magnetic structure to the second portion of said structure.

11. In combination, a burner, control means for said burner, a magnetic structure having a first portion for a first winding and a second portion, said magnetic structure comprising a shunt portion through which the flux set up by said first winding is adapted to pass and to be thereby diverted from the second portion of said magnetic structure, a thermocouple adapted to be subjected to the heat of a flame, a second winding connected in circuit with said thermocouple and operative upon energization of the thermocouple to produce in the shunt portion of said magnetic structure a flux for diverting the first-mentioned flux from the shunt portion of said magnetic structure to the second portion of said structure, and a motor connected to said control means for actuating same when the motor is effectively energized and responsive to the flux diverted to the second portion of said magnetic structure by the energization of said thermocouple.

12. In combination, a magnetic structure having a first portion for a first winding and a second portion, said magnetic structure comprising a shunt portion through which the flux is set up by said first winding is adapted to pass and to be diverted from the second portion of said magnetic structure, a thermoelectric generator adapted to be subjected to the heat of a flame, a second winding connected in circuit with said thermoelectric generator and operative upon energization of the thermoelectric generator to produce in the shunt portion of said magnetic structure a flux for diverting the first-mentioned flux from the shunt portion of said magnetic structure to the second portion of said structure, and means responsive to the flux diverted to the second portion of said magnetic structure by the energization of said thermoelectric generator.

THEODORE A. WETZEL.